Figure 1:
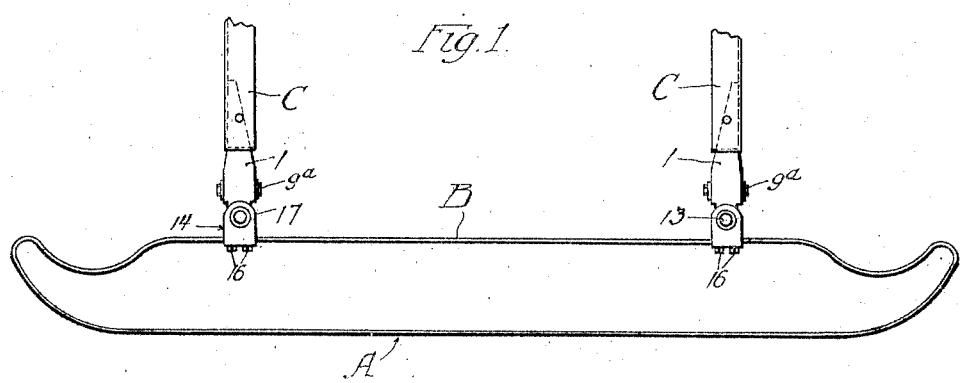

A. L. McGREGOR.
BUMPER FITTING.
APPLICATION FILED JAN. 17, 1921.

1,372,157.

Patented Mar. 22, 1921

2 SHEETS—SHEET 1.

Inventor.
Allan L. McGregor.

A. L. McGREGOR.
BUMPER FITTING.
APPLICATION FILED JAN. 17, 1921.
1,372,157.
Patented Mar. 22, 1921.
2 SHEETS—SHEET 2.
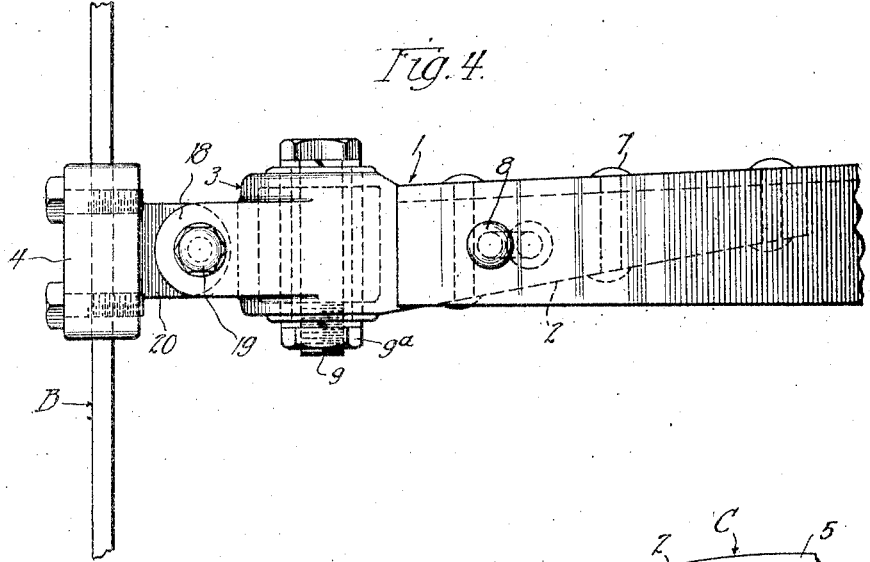
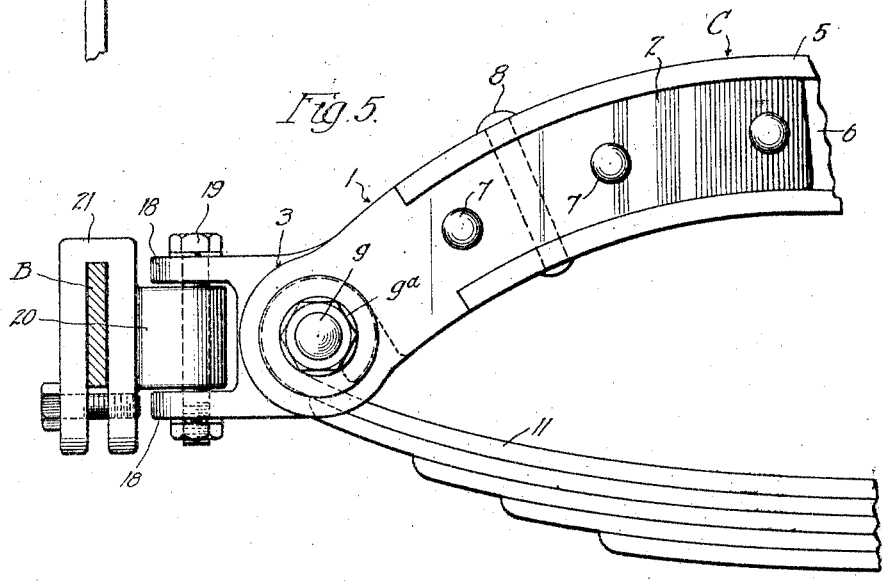
Inventor
Allan L. McGregor.

UNITED STATES PATENT OFFICE.

ALLAN L. McGREGOR, OF CHICAGO, ILLINOIS.

BUMPER-FITTING.

1,372,157.  Specification of Letters Patent.  Patented Mar. 22, 1921.

Application filed January 17, 1921. Serial No. 437,737.

*To all whom it may concern:*

Be it known that I, ALLAN L. MCGREGOR, a citizen of the United States, and a resident of Chicago, in the county of Cook and State of Illinois, have invented certain new and useful Improvements in Bumper-Fittings, of which the following is a specification.

This invention relates to automobile bumpers, and more particularly to a fitting designed to be built into the forward end of a motor vehicle frame and to form a permanent part thereof, such fitting including not only the ordinary spring bolt mounting, but also an arm especially designed to support a bracket by which a bumper may be readily attached to the vehicle.

The present development of automobile manufacture has reached a point where a bumper is becoming recognized as a standard equipment, although no especial arrangement has been provided for mounting bumpers to the frame of a vehicle, other than by different types of attaching brackets which are clamped or otherwise connected to the frame members at the forward or rear end of the vehicle. The result has been that manufacturers of bumpers have been compelled to devise various types of attaching brackets in order that their bumpers may be readily attached to different makes of motor vehicles.

The purpose of the present invention is to provide a fitting adapted to be built into a motor vehicle frame, and to form an integral part thereof, in order that bumpers may be readily applied without resorting to the use of separate attaching members, to the end that the bumper becomes an integral part of the vehicle rather than an attachment applied in a more or less insecure manner.

Figure 2:
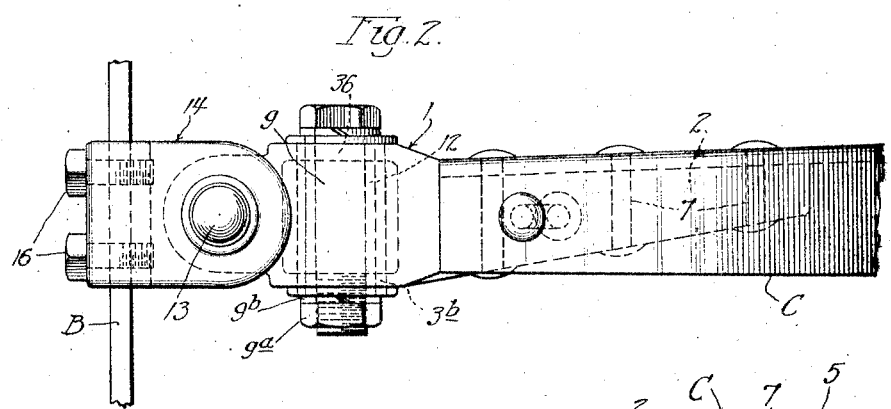
Figure 3:
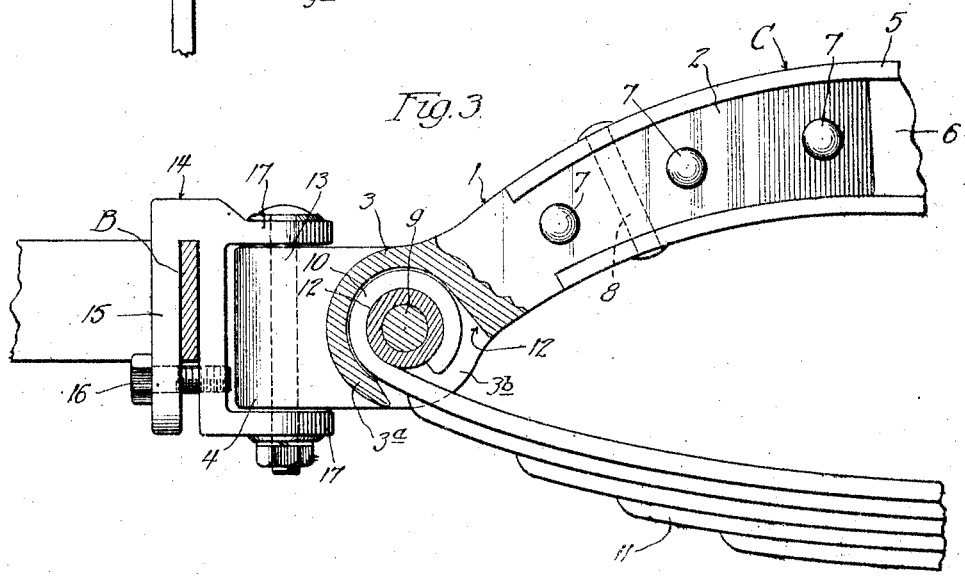

In the drawings is illustrated a preferred construction for a fitting embodying the invention, these drawings being briefly rescribed as follows:

Figure 1 is a top plan view of a convenient type of bumper attached to the frame members of a motor vehicle, through the medium of the fittings embodying the invention, Fig. 2 is an enlarged top plan view of one of the fittings as connected to a frame member, Fig. 3 is an enlarged view in side elevation of the parts shown in Fig. 2, and Figs. 4 and 5 are views corresponding to Figs. 2 and 3, and illustrating a modified construction of the fitting.

Without describing in detail the bumper illustrated in Fig. 1, the same may be considered to be typical of the large class of bumpers which comprise a front bar or impact section A, and a rear bar B, which has direct connection with the brackets or attaching members by which the bumper is mounted at the forward ends of the longitudinal frame members or sills C—C of a motor vehicle.

It is the common practice in forming the frame members or sills C—C of a motor vehicle, to form enlargements or heads at the extremities of these frame members which act in the nature of a housing to receive the extremity of the spring, the parts being connected together by means of the spring bolt which passes through the head of the frame. In providing for a fitting such as will presently be described, it is proposed to terminate the sills C—C short of their ordinary length and to eliminate entirely the integral head so that the actual extremity of the sills presents the ordinary U-shape of a channel bar.

The fitting, which is fixed to the end of the sills C—C, is a metallic casting or forging, comprising in general three portions; namely, a shank 2, a head 3 and a nose 4, all these portions forming integral parts of the complete fitting. The shank portion 2 is shaped to conform with the curvature of the end portion of the sill C, and to fit within the channel formed between the horizontal webs 5—5 thereof. As clearly shown in Fig. 2, the shank portion 2 has flat bearing engagement with a vertical web 6 of the sill C along one face, the opposite surface of the shank being tapered toward the rear or free end thereof. Extending transversely through the shank and at several points therealong, are a series of rivets, 7, which also pass through the vertical web 6 of the sill C. In addition to the horizontal rivets, another rivet 8 may be extended transversely through the shank 2, and the horizontal webs 5—5 of the sill. In this manner the shank of the fitting is permanently secured to the end of each sill C. The head 3 of the fitting is located at the base of the shank 2, and has the shape of a hollow cylindric member having the same conformation as is ordinarily employed in motor vehicle constructions; namely, a cylindric wall $3^a$ extending throughout the forward portion of the head, and end walls $3^b$ at the opposite ends. Two horizontally alined openings are located in the end walls $3^b$ through which a spring bolt 9 extends, said bolt being surrounded within the head 3 by the eye or looped end 10 of the upper leaf of the vehicle spring 11. As clearly shown in Fig. 3, a portion of the cylindric wall $3^a$ is removed throughout the under side of the head 3 to provide an opening to permit the insertion of the eye of the spring. In addition to the parts already mentioned, the spring bolt is held in place by the usual nut $9^a$ and spring washers $9^b$. Furthermore, a bushing 12 may be inserted between the spring bolt and the looped end of the spring, as is the ordinary practice.

Extending forwardly from the head 3 is the nose 4 comprising a vertically disposed block having a vertical bore therefor adapted to receive a pivot bolt 13. Pivotally connected to the projecting ends of the fitting is a clamping block 14 comprising an inverted U-shaped portion 15 adapted to have clamping engagement with the rear bar B of the bumper, the clamping engagement being maintained by means of a cap screw 16 extending through the parts of the U-shaped portion 15 just below the bar B. The clamping block 14 further comprises vertically spaced ears 17—17 extending from the rear face of the U-shaped portion 15, and embracing the nose 4 of the fitting, these ears being provided with registering bores adapted to receive the bolt 13, thus forming a pivotal connection between the clamping block 14 and the forward end of the fitting, the former having rotative movement about the vertical axis.

In Figs. 4 and 5 is shown a modified construction for the fitting, wherein the same construction is employed so far as the shank and head portions 2 and 3 respectively, are concerned, but differing somewhat in the manner in which the clamping block is pivotally connected to the forward end of the fitting. Instead of employing a nose or projecting block at the forward end of the fitting 2, ears 18—18 extend forwardly from the upper and lower portions of the head 3, these ears supporting a vertically disposed bolt 19 as before, and embracing between them a lug 20 integral with the clamping block 21. As before suggested, the parts are arranged in accordance with the previous description, and the modification in reality partakes of the nature of a reversal of parts; namely, the substitution of ears on the fitting in place of a single projecting lug, and vice versa, with respect to the clamping block 21.

In adapting the fitting for use as an integral part of a motor vehicle frame, the same would ordinarily include the U-shaped clamping block so that any type of bumper may be readily applied, providing it had a portion which would fit within the U-shaped portion of the clamping block. On the other hand, the variety of bumpers that may be applied to the vehicle, can readily be increased by using a clamping block of slightly different shape. In any event, the vehicle is provided with a member specially designed for the attachment of a bumper, thereby eliminating the necessity of drilling holes through the frame member, or mutilating the splash pans or adjacent parts in order to attach a bumper to the vehicle. Furthermore, it eliminates the addition in weight due to the use of cumbersome attaching members, and the uncertainty of a permanent connection, which must be present where frictional and clamping connections are used.

Having described a preferred construction for a fitting fulfilling the purpose set forth, I claim as my invention:

1. A fitting adapted to be permanently fixed to the end of a vehicle frame member, and comprising a head projecting beyond the end of the frame member, and an integral support for a bumper.

2. A fitting adapted to be permanently connected at the end of a vehicle frame member, and comprising a shank portion extending lengthwise of said frame member, a head adapted to be connected with the end of a vehicle spring, and an integral support for the attaching member of the bumper.

3. A fitting adapted to be permanently connected at the end of a vehicle frame member, and comprising a shank portion extending longitudinally of the frame member, a head portion located beyond the end of the frame member, and forming a support for the spring bolt, and a nose portion projecting outwardly from said head, and a clamping block pivotally connected with said nose.

4. A bumper attaching fitting adapted to be permanently built into the end of a vehicle frame member, and comprising a shank portion adapted for overlapping connection with said frame members, a head beyond the end of the frame member, and a support for a bumper integral with said head.

5. A fitting adapted to be permanently connected at the end of a vehicle frame member, and comprising a shank extending lengthwise and beyond the end of said frame member, a head adapted to be connected with the end of a vehicle spring, and a bumper attaching member pivotally connected with said fitting adjacent said head.

6. A fitting adapted to be permanently connected at the end of a vehicle frame member, and comprising a tapered shank portion extending longitudinally of the frame member, a head formed beyond said shank, and forming a support for the spring bolt, and a nose portion projecting outwardly from said head, and a clamping block pivotally connected with said nose.

In witness whereof, I hereunto subscribe my name this 11th day of January, A. D. 1921.

ALLAN L. McGREGOR.